(12) United States Patent
Zimmermann et al.

(10) Patent No.: US 12,399,296 B2
(45) Date of Patent: Aug. 26, 2025

(54) SYSTEM AND METHOD FOR AUTOMATIC WELL LOG DEPTH MATCHING

(71) Applicant: SCHLUMBERGER TECHNOLOGY CORPORATION, Sugar Land, TX (US)

(72) Inventors: Timon Zimmermann, Cambridge, MA (US); Lin Liang, Belmont, MA (US); Smaine Zeroug, Lexington, MA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 32 days.

(21) Appl. No.: 16/760,861

(22) PCT Filed: Oct. 30, 2018

(86) PCT No.: PCT/US2018/058073
§ 371 (c)(1),
(2) Date: Apr. 30, 2020

(87) PCT Pub. No.: WO2019/089490
PCT Pub. Date: May 9, 2019

(65) Prior Publication Data
US 2021/0181370 A1 Jun. 17, 2021

Related U.S. Application Data

(60) Provisional application No. 62/578,647, filed on Oct. 30, 2017.

(51) Int. Cl.
*G01V 5/04* (2006.01)
*G01V 5/12* (2006.01)
(Continued)

(52) U.S. Cl.
CPC .............. *G01V 5/045* (2013.01); *G01V 5/12* (2013.01); *G06N 3/045* (2023.01); *G06N 3/047* (2023.01); *G06N 3/082* (2013.01)

(58) Field of Classification Search
CPC .......... G01V 5/045; G01V 5/12; G06N 3/045; G06N 3/0455; G06N 3/047; G06N 3/0475; G06N 3/082; G06N 3/0454; G06N 3/0472
See application file for complete search history.

(56) References Cited

U.S. PATENT DOCUMENTS 4,312,040 A * 1/1982 Tinch ..................... G01V 11/00
702/6
4,320,469 A * 3/1982 Frawley ............... G01V 11/002
702/6

(Continued)

FOREIGN PATENT DOCUMENTS

EP 0561492 A2 9/1993
WO 2004063769 A2 7/2004

OTHER PUBLICATIONS

Luthi et al., "Well-Log Correlation Using a Back-Propagation Neural Network", Mathematical Geology, vol. 29, No. 3, 1997 (Year: 1997).*

(Continued)

*Primary Examiner* — Miranda M Huang
*Assistant Examiner* — Yao David Huang
(74) *Attorney, Agent, or Firm* — Jeffrey D. Frantz

(57) ABSTRACT

A method and computing system device for receiving a plurality of well logs. A depth shift between at least one well log of the plurality of well logs and at least one other well log may be determined based upon, at least in part, processing the plurality of well logs with a neural network. The plurality of well logs may be matched with one another
(Continued)

based upon, at least in part, the depth shift between the at least one well log and the at least one other well log.

16 Claims, 13 Drawing Sheets

(51) Int. Cl.
  *G06N 3/045* (2023.01)
  *G06N 3/047* (2023.01)
  *G06N 3/082* (2023.01)

(56) References Cited

U.S. PATENT DOCUMENTS

| | | | | |
|---|---|---|---|---|
| 5,812,068 | A | | 9/1998 | Wisler et al. |
| 6,012,017 | A | * | 1/2000 | Van Bemmel ............ G01V 1/50 |
| | | | | 702/14 |
| 9,934,364 | B1 | * | 4/2018 | Kumar ................... G06N 3/045 |
| 2006/0031017 | A1 | * | 2/2006 | Mathieu .................... G01V 3/20 |
| | | | | 702/6 |
| 2007/0011115 | A1 | | 1/2007 | Smith et al. |
| 2010/0094557 | A1 | | 4/2010 | Yu et al. |
| 2013/0144531 | A1 | * | 6/2013 | Johnston ................. E21B 44/00 |
| | | | | 702/9 |
| 2014/0316706 | A1 | * | 10/2014 | Grant ..................... G01V 1/362 |
| | | | | 702/11 |
| 2015/0088424 | A1 | * | 3/2015 | Burlakov ................. G01V 1/40 |
| | | | | 702/6 |
| 2015/0177405 | A1 | * | 6/2015 | Jannin ..................... G01V 1/46 |
| | | | | 702/6 |
| 2015/0241584 | A1 | * | 8/2015 | Aarre ..................... G01V 1/364 |
| | | | | 367/7 |
| 2015/0241591 | A1 | | 8/2015 | Burmester et al. |
| 2015/0347898 | A1 | * | 12/2015 | Hiu ...................... G01V 99/005 |
| | | | | 706/21 |
| 2016/0018553 | A1 | * | 1/2016 | Celepcikay ............... G01V 3/38 |
| | | | | 324/323 |
| 2019/0122073 | A1 | * | 4/2019 | Ozdemir ................ G06F 18/24 |

OTHER PUBLICATIONS

Maiti et al., "Neural network modelling and classification of lithofacies using well log data: a case study from KTB borehole site", Geophys. J. Int. (2007) 169, 733-746 (Year: 2007).*

Brown et al., "Use of Noise to Augment Training Data: A Neural Network Method of Mineral-Potential Mapping in Regions of Limited Known Deposit Examples," Natural Resources Research, vol. 12, No. 2, Jun. 2003 (Year: 2003).*

Kemp, "An Algorithm for the Stratigraphic Correlation of Well Logs," Mathematical Geology, vol. 14, No. 3, 1982 (Year: 1982).*

Search Report issued in European Patent Patent Application No. 18873209.3 dated Jun. 6, 2021, 5 pages.

Zoraster, S. et al., "Curve alignment for well-to-well log correlation", SPE-90471-MS, presented at the SPE Annual Technical Conference and Exhibition, Houston, Texas, USA, 2014, pp. 26-29.

Yunsheng and Bansal, "Integrated Workflow on Lithofacies Modeling", SPE 183963, Society of Petroleum Engineers, Mar. 2017, 11 pages.

Berteig et al., "Lithofacies Prediction from Well Data", SPWLA-1985-TT, Society of Petrophysicists and Well-Log Analysts, Jun. 1985, 25 pages.

Fang et al., "Computer-aided well log correlation", AAPG Bulletin, vol. 76, pp. 307-317, Jan. 1992.

Search Report and Written Opinion of International Patent Application No. PCT/US2018/058073 issued on Feb. 22, 2019; 17 pages.

International Preliminary Report on Patentability of International Patent Application No. PCT/US2018/058073 issued on May 14, 2020; 14 pages.

Kerzner, "A Solution to the Problem of Automatic Depth Matching", SPWLA-1984-VV, Society of Petrophysicists and Well-Log Analysts, Jun. 1984, 18 pages.

Nadezhdin et al., "Algorithms of Automatic Core-Log Depth-Shifting in Problems of Petrophysical Model Construction", SPE-171202-MS, Society of Petroleum Engineers, Oct. 2014, 10 pages.

Spalburg, "An Algorithm for Simultaneous Deconvolution, Squaring and Depth-Matching of Logging Data", Society of Petrophysicists and Well-Log Analysts, Jun. 1989, 13 pages.

Stefan M. Luthi, "Textural Segmentation of Digital Rock Images into Bedding Units Using Texture Energy and Cluster Labels," Mathematical Geology, vol. 26, No. 2, 1994.

Bergstra et al., "Hyperopt: a python library for model selection and hyperparameter optimization", Computational Science & Discovery, vol. 8, No. 1, 2015, 25 pages.

Communication Pursuant to Article 94(3) issued in European Patent Application No. 18873209.3 dated Dec. 5, 2022, 6 pages.

* cited by examiner

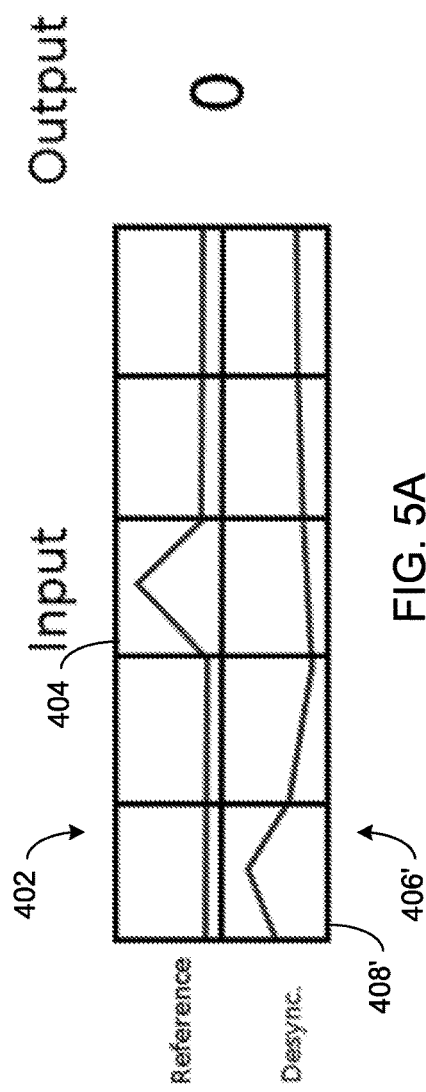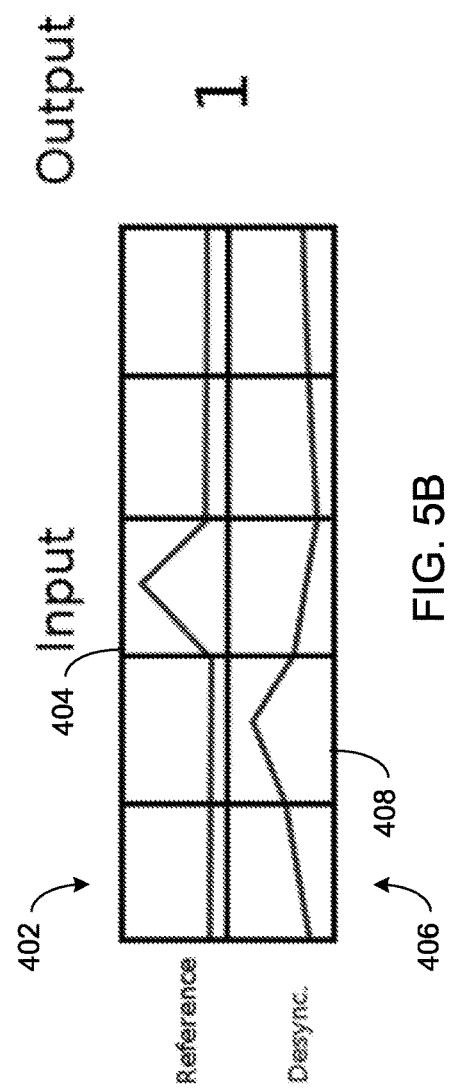

SYSTEM AND METHOD FOR AUTOMATIC WELL LOG DEPTH MATCHING

CROSS-REFERENCE TO RELATED APPLICATIONS

This application is a National Stage Entry of International Patent Application No. PCT/US2018/058073, entitled "System and Method for Automatic Well Log Depth Matching." filed on Oct. 30, 2018, which claims priority to and the benefit of U.S. Provisional Application having Ser. No. 62/578,647 filed on Oct. 30, 2017, the entire contents of which are incorporated herein by reference in their entirety.

BACKGROUND

In the petroleum industry, devices or tools based on various physical measurements may be lowered into a well to measure various characteristics of the formation penetrated by the well as a function of depth, which is called well logging. These physical properties and parameters of the rock surrounding a borehole may be integrated to estimate a formation model in terms of petrophysical, geophysical, and/or geomechanical properties that can be used for identifying pay zones, evaluating reserves, designing completion jobs, and/or improving reservoir productivity. These measurements are subject to environmental effects and systematic noise. Furthermore, the depth parameter itself may be a source of error. This arises from the fact that the measurement tool string is typically subjected to many perturbations downhole during the logging operations, including for example, effects from a tool sticking against a borehole wall.

Due to operational restrictions and limitations in the number of multi-physical measurements that can be carried out downhole at any one logging run, multiple logging 'passes' are typically carried out with the measurement string made of separate devices at each run at the exception of a few key measurements such the gamma ray (GR). GR measurements are used in each logging pass with the objective to provide formation responses that can be used to match or synchronize the logs from the various logging passes. The synchronization between the various measurement logs is critical for identifying correlation between dissimilar measurements and help support the integrated inversion of multiple physical data to provide a consistent common formation model.

As mentioned above, due to differing environmental perturbations and tool sticking arising at each pass from irregular borehole shape or high well curvature, the GR logs from the separate passes may not match each other due to inaccurate measurement on depth. Their synchronization is not trivial especially when the formation exhibits thin laminations such as the case for the unconventional formations known to be present in the Permian or Marcellus basin. The difficulty in the synchronization of GR logs led many well log interpretation algorithms to ignore the mismatch and assume the logs to be aligned; this leads to sub-optimal interpretation at best and completely useless results at worst particularly for thinly-laminated formations.

Gamma-ray log depth matching has remained a long-standing challenge within the industry albeit it has been widely studied. Indeed, most of the synchronization techniques suffer from the following difficulties: difference in signal magnitude; different resolutions and sampling rates; distorted signals from tool sticking effects; occasional time-lapse changes due to mud invasion or borehole wall deformation between passes; and hardware and environmental noises. All these effects may lead to unreliable well log interpretation, particularly for thinly-laminated formations where small shifts may completely misalign the correlation between different logs, which impacts the interpretation quality significantly.

SUMMARY OF DISCLOSURE

In some implementations, the well log depth matching process of the present disclosure may address the above-noted depth matching problem using a machine learning based approach. To allow automated data interpretation, the well log depth matching process of the present disclosure may include a robust and fully automatic algorithm for depth matching gamma-ray logs, which may be used as a proxy to match the depth of well logs measured in multiple logging passes. This may be realized by training a neural network (NN). In some implementations, the well log depth matching process of the present disclosure may use data structuring and data augmentation, which permits the process to obtain, from very limited data labeled manually, a sufficiently large dataset for training. To push the performance at a fully automated level, the well log depth matching process of the present disclosure may employ different stacking and filtering methods, leading to nearly perfectly synchronized signals. In addition to training the neural network on real measured data, the neural network may be trained using synthetic gamma-ray logs, or realistic synthetic gamma-ray logs refined using Generative Adversarial Networks (GANs), or combinations of different data sources.

Embodiments included herein may be configured to match the reference depth of different well logs (e.g., using gamma-ray logs). Well logging is the process of recording various physical, chemical, electrical, or other properties of the rock/fluid mixtures penetrated by drilling a borehole into the earth's crust. Here, a gamma-ray log is a record of gamma-ray signals that refer to the depth along the well trajectory. Depth is a reference coordinate for the recorded signals along the well trajectory. As a reference, the depth may be recorded using special devices, which may include, but are not limited to wireline, logging while drilling "LWD", other specialized devices, etc. Once these devices have obtained the necessary information it may be provided to various computing devices such as those shown in FIG. 1 and as will be discussed in greater detail below.

In some embodiments, a computer-implemented method is executed on a computing device and may include but is not limited to receiving a plurality of well logs. A depth shift between at least one well log of the plurality of well logs and at least one other well log may be determined based upon, at least in part, processing the plurality of well logs with a neural network. The plurality of well logs may be matched with one another based upon, at least in part, the depth shift between the at least one well log and the at least one other well log.

One or more of the following example features may be included. At least one point in the at least one well log may be defined. A first window may be generated around the at least one point in the at least one well log. At least one corresponding point in the at least one other well log may be identified. A second window may be generated around the at least one corresponding point in the at least one other well log. Defining the at least one point in the at least one well log may include receiving a set of manually picked points of interest. Defining the at least one point in the at least one well log may include automatically generating a set of points of interest. Determining the depth shift between the at least one well log and the at least one other well log may include performing one or more data augmentation transformations on at least one well log to generate training data for the neural network. Determining the depth shift between the at least one well log and the at least one other well log may include training the neural network based upon, at least in part, an accuracy metric. One or more of field data, synthetic data, realistic synthetic data refined by augmentation-enabling networks and Generative Adversarial Networks (GANs), may be used for training the neural network. Matching the plurality of well logs with one another may include aligning the plurality of well logs based upon, at least in part, a plurality of anchor points. Aligning the plurality of well logs may include sampling at least one of the plurality of well logs between the plurality of anchor points.

In another example implementation, a computing system may include one or more processors and one or more memories, wherein the computing system is configured to perform operations that may include but are not limited to receiving a plurality of well logs. A depth shift between at least one well log of the plurality of well logs and at least one other well log may be determined based upon, at least in part, processing the plurality of well logs with a neural network. The plurality of well logs may be matched with one another based upon, at least in part, the depth shift between the at least one well log and the at least one other well log.

One or more of the following example features may be included. A first window may be generated around the at least one point in the at least one well log. At least one corresponding point in the at least one other well log may be identified. A second window may be generated around the at least one corresponding point in the at least one other well log. Defining the at least one point in the at least one well log may include receiving a set of manually picked points of interest. Defining the at least one point in the at least one well log may include automatically generating a set of points of interest. Determining the depth shift between the at least one well log and the at least one other well log may include performing one or more data augmentation transformations on at least one well log to generate training data for the neural network. Determining the depth shift between the at least one well log and the at least one other well log may include training the neural network based upon, at least in part, an accuracy metric. One or more of field data, synthetic data, realistic synthetic data refined by augmentation-enabling networks and Generative Adversarial Networks (GANs), may be used for training the neural network. Matching the plurality of well logs with one another may include aligning the plurality of well logs based upon, at least in part, a plurality of anchor points. Aligning the plurality of well logs may include sampling at least one of the plurality of well logs between the plurality of anchor points.

This summary is provided to introduce a selection of concepts that are further described below in the detailed description. This summary is not intended to identify essential features of the claimed subject matter, nor is it intended to be used as an aid in limiting the scope of the claimed subject matter.

BRIEF DESCRIPTION OF THE DRAWINGS

Embodiments of the present disclosure are described with reference to the following figures.

FIG. 5 illustrates 2 of 121 possible outputs created from one pair of signals in accordance with implementations of various techniques described herein;

Like reference symbols in the various drawings may indicate like elements.

DETAILED DESCRIPTION

Figure 1:
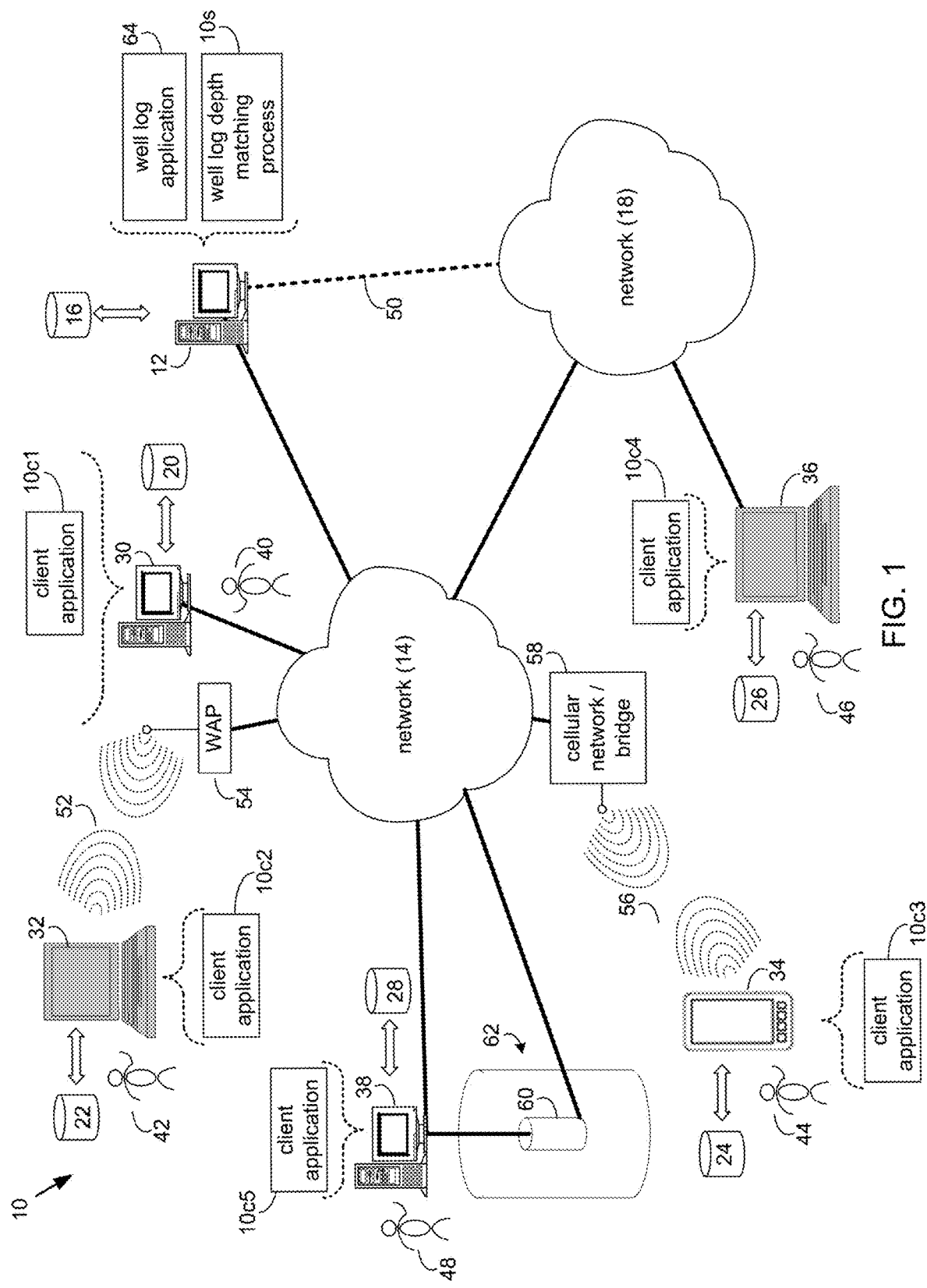
FIG. 1 is a diagrammatic view of a distributed computing network including a computing device that executes a well log depth matching process according to an implementation of the present disclosure.
Figure 2:
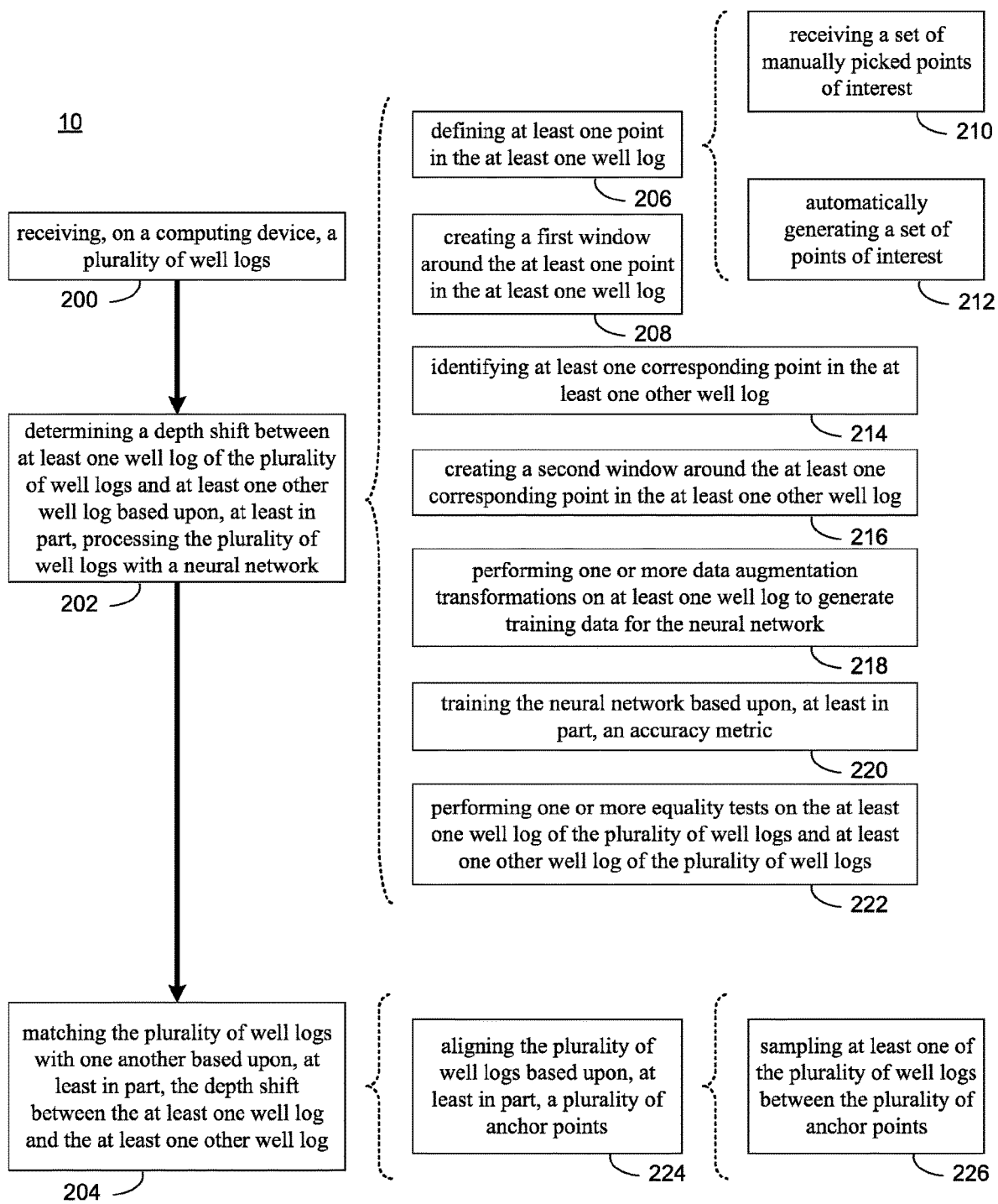
FIG. 2 is a flow chart of the well log depth matching process of FIG. 1 in accordance with implementations of various techniques described herein.

The discussion below is directed to certain implementations. It is to be understood that the discussion below is only for the purpose of enabling a person with ordinary skill in the art to make and use any subject matter defined now or later by the patent "claims" found in any issued patent herein.

It is specifically intended that the claimed combinations of features not be limited to the implementations and illustrations contained herein, but include modified forms of those implementations including portions of the implementations and combinations of elements of different implementations as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the claimed invention unless explicitly indicated as being "critical" or "essential."

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered a same object or step.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc. It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

Referring to FIG. 1, there is shown well log depth matching process 10. For the following discussion, it is intended to be understood that well log depth matching process 10 may be implemented in a variety of ways. For example, well log depth matching process 10 may be implemented as a server-side process, a client-side process, or a server-side/client-side process.

For example, well log depth matching process 10 may be implemented as a purely server-side process via well log depth matching process 10s. Alternatively, well log depth matching process 10 may be implemented as a purely client-side process via one or more of client-side application 10c1, client-side application 10c2, client-side application 10c3, and client-side application 10c4. Alternatively still, well log depth matching process 10 may be implemented as a server-side/client-side process via server-side well log depth matching process 10s in combination with one or more of client-side application 10c1, client-side application 10c2, client-side application 10c3, client-side application 10c4, and client-side application 10c5. In such an example, at least a portion of the functionality of well log depth matching process 10 may be performed by well log depth matching process 10s and at least a portion of the functionality of well log depth matching process 10 may be performed by one or more of client-side application 10c1, 10c2, 10c3, 10c4, and 10c5.

Accordingly, well log depth matching process 10 as used in this disclosure may include any combination of well log depth matching process 10s, client-side application 10c1, client-side application 10c2, client-side application 10c3, client-side application 10c4, and client-side application 10c5.

Well log depth matching process 10s may be a server application and may reside on and may be executed by computing device 12, which may be connected to network 14 (e.g., the Internet or a local area network). Examples of computing device 12 may include, but are not limited to: a personal computer, a server computer, a series of server computers, a mini computer, a mainframe computer, or a dedicated network device.

The instruction sets and subroutines of well log depth matching process 10s, which may be stored on storage device 16 coupled to computing device 12, may be executed by one or more processors (not shown) and one or more memory architectures (not shown) included within computing device 12. Examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

The instruction sets and subroutines of client-side application 10c1, 10c2, 10c3, 10c4, 10c5 which may be stored on storage devices 20, 22, 24, 26, 28 (respectively) coupled to client electronic devices 30, 32, 34, 36, 38 (respectively), may be executed by one or more processors (not shown) and one or more memory architectures (not shown) incorporated into client electronic devices 30, 32, 34, 36, 38 (respectively). Examples of storage devices 20, 22, 24, 26, 28 may include but are not limited to: hard disk drives; tape drives; optical drives; RAID devices; random access memories (RAM); read-only memories (ROM), and all forms of flash memory storage devices.

Examples of client electronic devices 30, 32, 34, 36, 38 may include, but are not limited to, personal computer 30, 38, laptop computer 32, mobile computing device 34, notebook computer 36, a netbook computer (not shown), a server computer (not shown), a gaming console (not shown), a data-enabled television console (not shown), and a dedicated network device (not shown). Client electronic devices 30, 32, 34, 36, 38 may each execute an operating system.

Users 40, 42, 44, 46, 48 may access well log depth matching process 10 directly through network 14 or through secondary network 18. Further, well log depth matching process 10 may be accessed through secondary network 18 via link line 50.

The various client electronic devices (e.g., client electronic devices 30, 32, 34, 36) may be directly or indirectly coupled to network 14 (or network 18). For example, personal computer 30 is shown directly coupled to network 14. Further, laptop computer 30 is shown wirelessly coupled to network 14 via wireless communication channels 52 established between laptop computer 30 and wireless access point (WAP) 54. Similarly, mobile computing device 34 is shown wirelessly coupled to network 14 via wireless communication channel 56 established between mobile computing device 34 and cellular network/bridge 58, which is shown directly coupled to network 14. WAP 54 may be, for example, an IEEE 802.11a, 802.11b, 802.11g, 802.11n, Wi-Fi, and/or Bluetooth device that is capable of establishing wireless communication channel 52 between laptop computer 32 and WAP 54. Additionally, notebook computer 36 is shown directly coupled to network 18 via a hardwired network connection.

In some implementations, a client electronic device (e.g., client electronic device 38) may be electronically coupled to at least one recording device 60 (e.g. gamma-ray too, wireline, LWD, etc.). As will be discussed in greater detail below, device 60 may be configured to be deployed into, or adjacent, a well (e.g., well 62) or other structure.

In some embodiments, well log depth matching process 10 may communicate with, interact with, and/or include a component or module of a well log application (e.g., well log application 64).

In an embodiment, the instruction sets and subroutines of well log application 64 may be stored, e.g., on storage device 16 associated with server computer 12, which executes well log application 64, and/or another suitable storage device. Further, users (e.g., one or more of users 40, 42, 44, 46, 48) may access well log application 64 in order to access well logs and other data received from device 60 or other mechanisms. The users may access well log application 64 via one or more suitable applications, such as client side applications 10c1-10c5 (e.g., which may include a web browser, a client electronic meeting application, or another application) and/or via a different application (not shown). Additionally, while some users are depicted as being connected with server computer 12 (and therefore with electronic well log application 64) via network 14, which may include the Internet, in other embodiments, one or more users may be directed connected to server computer 12 and/or connected with server computer 12 via, e.g., a local area network and/or similar connection.

As generally discussed above, a portion and/or all of the functionality of well log depth matching process 10 may be provided by one or more of client side applications 10c1-10c5. For example, in some embodiments well log depth matching process 10 (and/or client-side functionality of well log depth matching process 10) may be included within and/or interactive with client-side applications 10c1-10c5, which may include client side electronic well log applications, web browsers, or another application. Various additional/alternative configurations may be equally utilized.

As discussed above and referring also at least to FIGS. 2-13, well log depth matching process 10 may receive 200 a plurality of well logs. A depth shift between at least one well log of the plurality of well logs and at least one other well log may be determined 202 based upon, at least in part, processing the plurality of well logs with a neural network. The plurality of well logs may be matched 204 with one another based upon, at least in part, the depth shift between the at least one well log and the at least one other well log.

In some implementations, well log depth matching process 10 may receive 200 a plurality of well logs. For example and in some implementations, well log depth matching process 10 may receive 200 a plurality of well logs from a plurality of sources. For example, a gamma-ray tool may be configured to record naturally occurring gamma rays in formations adjacent to a wellbore. In some implementations, the gamma-ray tool may comprise at least a portion of a recording device (e.g., recording device 60) deployed into, or adjacent, a well (e.g., well 62) or other structure. In some implementations, a log of the gamma-rays may be recorded and used for e.g., correlation between wells. For example, a well log of the total natural radioactivity may be measured. The measurement can be made in both openhole and through casing. The depth of investigation may be a few inches, so that the log normally measures the flushed zone. Shales and clays are responsible for most natural radioactivity, so the gamma ray log often is a good indicator of such rocks. However, other rocks are also radioactive, notably some carbonates and feldspar-rich rocks. The log is also used for correlation between wells, for depth correlation between open and cased hole, and for depth correlation between logging runs.

As discussed above, due to operational restrictions and limitations in the number of multi-physical measurements that can be carried out downhole at any one logging run, multiple logging 'passes' are typically carried out with the measurement string made of separate devices at each run at the exception of a few key measurements such the gamma ray (GR). GR measurements are used in each logging pass with the objective to provide formation responses that can be used to match or synchronize the logs from the various logging passes. As such, the synchronization between the various measurement logs may be critical for identifying correlation between dissimilar measurements and help support the integrated inversion of multiple physical data to provide a consistent common formation model.

As mentioned above, due to differing environmental perturbations and tool sticking arising at each pass from irregular borehole shape or high well curvature, the GR logs from the separate passes may not match each other due to inaccurate measurement on depth. Their synchronization is not trivial especially when the formation exhibits thin laminations such as the case for the unconventional formations known to be present in the Permian or Marcellus basin. The difficulty in the synchronization of GR logs led many conventional well log interpretation algorithms to ignore the mismatch and assume the logs to be aligned; this leads to sub-optimal interpretation at best and completely useless results at worst particularly for thinly-laminated formations. In some implementations, the plurality of well logs may be acquired during the same pass through a well. In some implementations, the plurality of well logs may be acquired during different passes through a well. In some implementations, the received 200 well logs may be associated with the same well. For example and as will be discussed in greater detail below, well log depth matching process 10 may correlate different well logs based upon, at least in part, a depth shift between at least two well logs.

As will be discussed in greater detail below and in some implementations of the present disclosure, well log depth matching process 10 may be hypothesized on a worst-case scenario based on empirical evidences, to yield a maximum shift between well logs. As an example, assume a maximum depth shifting of e.g., 120 inches. To take advantage of that assumed maximum depth shifting, consider the highest sampling rate of the gamma-ray logs to be at e.g., 2 inch between samples. In some implementations, given a point of interest in a reference gamma-ray (GR) signal, it may be expected that well log depth matching process 10 finds the corresponding point in a desynchronized GR within e.g., 60 data points. This may be a very liberal assumption in that the mismatch is expected to be much less than the extreme of 60 depth points—for a typical logging sampling of e.g., ½ foot, 60 depth points may correspond to 30 feet which is well above the mismatch levels typically encountered even in highly-laminated formations with irregular boreholes.

In some implementations, well log depth matching process 10 may determine 202 a depth shift between at least one well log of the plurality of well logs and at least one other well log based upon, at least in part, processing the plurality of well logs with a neural network. For example and in some implementations, well log depth matching process 10 may utilize machine learning (e.g., at least one neural network). For example, the machine learning problem of well log depth matching process 10 may be rephrased as follows: given a point of interest in a reference signal $S_{ref}$, find the corresponding point in a desynchronized signal $S_{desync}$, where the point of interest is pre-proposed by some algorithm, such as simply representing the peaks in the signals. It should be noted that in some cases, the reference signal may correspond to a small section of the reference log around a reference point, which may be defined by a window size, e.g., in some examples included herein a window of 121 points is used.

Figure 3:
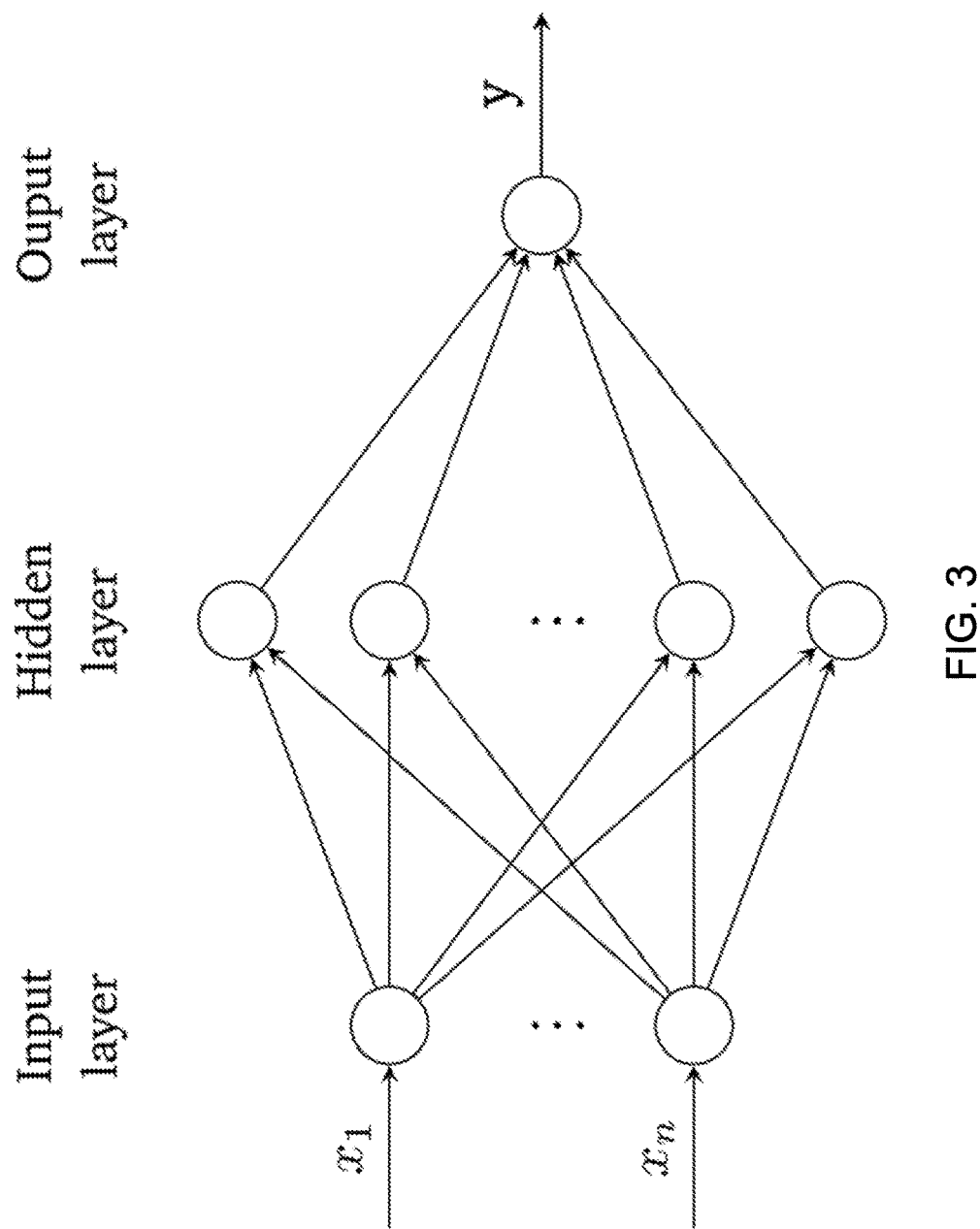
FIG. 3 is a flow diagram of a conceptual fully connected neural network with one hidden layer (the actual neural network may contain multiple hidden layers) in accordance with implementations of various techniques described herein.

In some implementations and as will be discussed in greater detail below, well log depth matching process 10 may include a fully connected neural network, as conceptually depicted in FIG. 3, with Parametric Rectified Linear Unit (PReLU) activation functions or other activation functions, as known in the art. The number of hidden layers and neurons of the network may be determined with hyperparameter optimization (HyperOpt), during which an optimum network performance may be sought.

In some implementations, determining 202 the depth shift between at least one well log of the plurality of well logs and at least one other well log based upon, at least in part, processing the plurality of well logs with a neural network may generally include interpolating a reference signal ($S_{ref}$) and a desynchronized signal ($S_{desync}$) to match their sampling rates.

In some implementations, determining 202 the depth shift between at least one well log of the plurality of well logs and at least one other well log may include defining at least one point in the at least one well log and identifying at least one corresponding point in the at least one other well log. For example, defining at least one point may include defining 206 a point of interest. In some implementations, well depth log matching process 10 may define 206 one or more points of change in the at least one well log (e.g., a peak in the reference signal ($S_{ref}$)). It will be appreciated that any portion of the reference signal may be used as a point of interest. For example, local minima, a local maxima, a high contrast sharp transition, etc. may be defined 206 as the point of interest.

Figure 4:
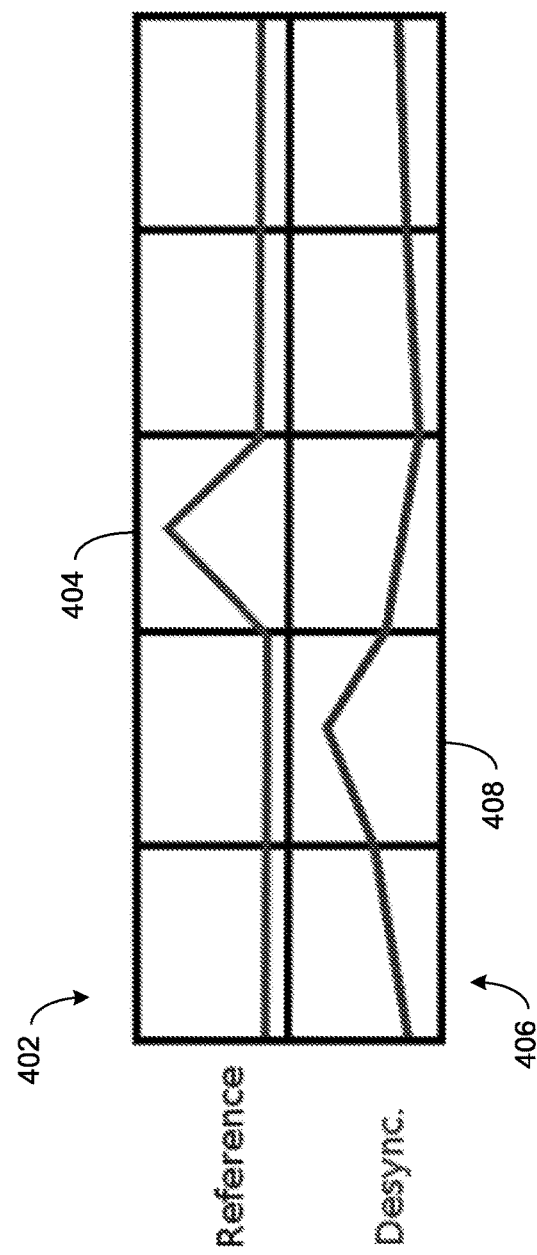
FIG. 4 illustrates a diagram of two signals or logs in accordance with implementations of various techniques described herein.

In some implementations, determining 202 the depth shift between at least one well log of the plurality of well logs and at least one other well log may include creating a window a point of interest in the reference signal ($S_{ref}$). In some implementations, well log depth matching process 10 may generate 208 a first window of e.g., 121 points (a center point 60 points in each direction) around the defined point of interest. For example, and as shown in FIG. 4, well log depth matching process 10 may generate a first window of size e.g., 5 (e.g., window 402) around center point (e.g., defined point of interest 404) of a least one well log (e.g., reference signal ($S_{ref}$)).

In some implementations, defining 206 a point of interest in the at least one well log may include receiving 210 a set of manually picked points of interest. For example and in some implementations, a user (e.g., an expert) may define certain points (e.g., peaks) in the at least one well log (e.g., reference signal ($S_{ref}$)). In some implementations, defining 206 a point of interest in the at least one well log may include automatically generating 212 a set of points of interest. For example, it may be clear that matched signals (e.g., reference signal ($S_{ref}$) and desynchronized signal ($S_{desync}$)) are of the same type as the training ones, e.g., mainly peaks as used by human annotators. By doing so, the following may not be considered problematic: which points a user labels as good features vs. which points would maximize the accuracy/performance of the model. Namely, some non-peak points might maximize the accuracy better than the peaks. For example, defining only peaks as points of interest, in this example, as a human annotator may so choose, may not always allow the depth shift to be determined as accurately. In some implementation, the automatic generation 212 of points may generally be referred to as a point proposal technique. In some implementations, incorporating the point proposal technique within the machine learning model of well log depth matching process 10 may improve the performance, since the model could potentially then choose to fallback to selecting peaks if that is what maximizes the accuracy.

This technique could be summed up by the term "end-to-end back-propagation", both the point proposal and shift prediction training together towards a unified optimization. In some implementations, well log depth matching process 10 may employ a machine learning framework that includes both point proposal and shift prediction in the training loop of the neural network.

In some implementations, well depth log matching process 10 may identify 214 at least one corresponding point in the at least one other well log (e.g., desynchronized signal ($S_{desync}$)). For example, well depth log matching process 10 may generate 216 a window around the same depth (e.g., where the corresponding point should be) in the desynchronized signal ($S_{desync}$). In some implementations, well depth log matching process 10 may create or generate a second window of e.g., 121 points (a center point ±60 points in each direction) around the defined point of interest. Referring again to the example of FIG. 4, well log depth matching process 10 may generate 216 a second window of size e.g., 121 (e.g., window 406) of a least one other well log (e.g., desynchronized signal ($S_{desync}$)). In some implementations, the desired output of well log depth matching process 10 may be the cell index corresponding to the center of $S_{ref}$ The problem may then become a problem of classification with 121 target classes. In this manner, well depth log matching process 10 may identify 214 at least one corresponding point in the at least one other well log (e.g., desynchronized signal ($S_{desync}$)). For example, well depth log matching process 10 may determine 202 the depth shift by classifying each point or portion of the second window (e.g., window 406) with at least the point of interest (e.g., defined point of interest 404) to determine the depth shift between matching points between the first window (e.g., window 402) and the second window (e.g., window 406) relative to the point of interest (e.g., defined point of interest 404).

In some implementations, well log depth matching process 10 may label e.g., 178 pairs from e.g., 10 different wells to form a dataset. In some implementations, the e.g., 178 pairs from the 10 different wells may be manually labeled. Well log depth matching process 10 may create one output per class for each pair of points, by sliding a window of size e.g., 121. In some implementations, this may result in 178*121=21,538 sequences of size 2×121. The creation procedure of well log depth matching process 10 may have at least one advantage: the resulting dataset is fully balanced. For example, because each target class has the same number of examples, well log depth matching process 10 may not have to re-weight the loss function and/or resample the dataset during the training phase. In some implementations, the examples of FIGS. 5A and 5B show two of 121 possible outputs. As will be discussed in greater detail below, at least a portion of the dataset (e.g., 21,530 sequences of size 2×121) may be fed or otherwise provided to well log depth matching process 10 to train a neural network that can be used to determine 202 a depth shift between at least one well log of the plurality of well logs and at least one other well log.

For example, FIGS. 4-5B demonstrate an input X (e.g., window 402 and window 406 compared about point of interest 404) where the correct output y will be "1" when point 408 is shifted as shown in FIG. 4 and FIG. 5B and an output y that will be "0" when point 408' of second window 406' is shifted as shown in FIG. 5A. For example, in FIG. 5A, the peak (corresponding to the peak in the reference log) in the desynchronized log (i.e., the peak in the desynchronized log) is located in the grid cell with index #0 (index starting from 0). In FIG. 5B, the peak in the desynchronized log is located in the grid cell #1 (index starting from 0). It will be appreciated that while FIGS. 5A and 5B show only 5 grid cells (for the sake of easy visualization), there may be any number of grid cells. In some implementations, these outputs of y may be generally referred to as "labels". In some implementations, these labels or outputs of y may be used by well log depth matching process 10 to determine the depth shift between the well logs.

As discussed above and in some implementations, well log depth matching process 10 may determine 202 a depth shift between at least one well log of the plurality of well logs and at least one other well log based upon, at least in part, processing the plurality of well logs with a neural network. To feed inputs to the fully connected network (as shown in FIG. 3), well log depth matching process 10 may concatenate the inputs horizontally and model the architecture to output a probability over the possible shifts:

$X_{input} \in R^{242}$ $y_{output} \in R^{121}$

In some implementations, the retained shift has the highest probability:

shift=argmax($y$)

Accordingly, well log depth matching process 10 may determine 202 the depth shift with the highest probability from a plurality of possible shifts from the neural network.

Embodiments of the present disclosure may improve the accuracy of the depth shift and accordingly the correlation between a plurality of well logs. For example and as will be discussed in greater detail below, the correlation between well logs may be dependent upon determining the depth shift between well logs. In this manner, well log depth matching process 10 may improve the accuracy of the determined depth shift by improved training of the neural network as discussed below.

In some implementations and in order to create a more robust machine learning system, determining 202 the depth shift between at least one well log of the plurality of well logs and at least one other well log may include performing 218 one or more data augmentation transformations on at least one well log to generate training data for the neural network. For example, the one or more data augmentation transformations on the at least one well log may permit well log depth matching process 10 to cover unexplored input space, improve the generalization capacities, and prevent over-fitting. For example, well log depth matching process 10 may need label-preserving transformations and therefore prior knowledge about the invariant properties of the data against X or Y transformations. In some implementations of data augmentation, during the training phase, well log depth matching process 10 may pull M samples from the sequences (e.g., as discussed above) and randomly apply one or more of the following data augmentation transformations:

Up-down flip of both signals
Left-right flip of both signals
Additive Gaussian noise (different standard deviations)
Additive Cauchy noise (clamped to a maximum value)
Additive Poisson noise While the above examples of data augmentation transformations have been provided, it will be appreciated that other data augmentation transformations are within the scope of the present disclosure. In some implementations, this new group of M samples, processed and non-processed, may form a training batch for one gradient update. In some implementations, "one gradient update" may generally refer to one training step, or one iteration during the training process. In some implementations, well log depth matching process 10 may train using a gradient-based optimization method.

To train, optimize, and test the neural network, well log depth matching process 10 may split the samples into three subsets: e.g., 55% for training, 35% for validation and 10% for testing. Well log depth matching process 10 may then train the network with an Adamax optimizer and a starting learning rate of e.g., 0.001. Well log depth matching process 10 may also utilize a scheduler with a patience of e.g., 10 to monitor the validation loss, and decrease the learning rate by a factor of 10 when the patience is reached. The objective function may be a standard multi class cross-entropy loss.

In some implementations, determining 202 the depth shift between at least one well log of the plurality of well logs and at least one other well log may include training 220 the neural network based upon, at least in part, an accuracy metric. In some implementations, the training and hyper-optimization phase may be monitored by well log depth matching process 10 with an additional metric (e.g., an ε-accuracy) on top of the conventional validation loss and accuracy. For example, due to the ambiguity of some labels, the "ground-truth" might not always be completely accurate and the use of the ε-accuracy may compensate for such cases:

Accuracy: $y_{prediction} = y_{true} \Rightarrow$ True

ε-accuracy: $y_{prediction} \in y_{true} \pm 2 \Rightarrow$ True

Figure 8:
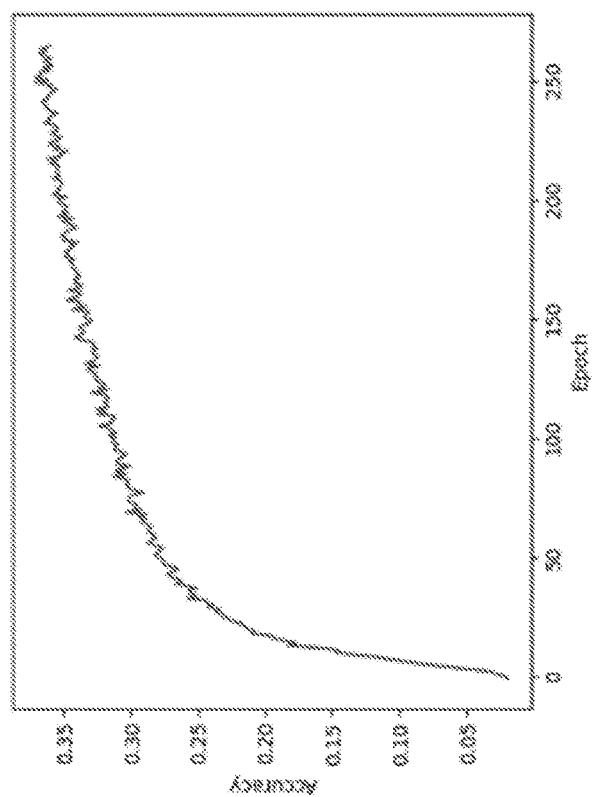
FIG. 8 illustrates accuracy with respect to a number of epochs in accordance with implementations of various techniques described herein.
Figure 9:
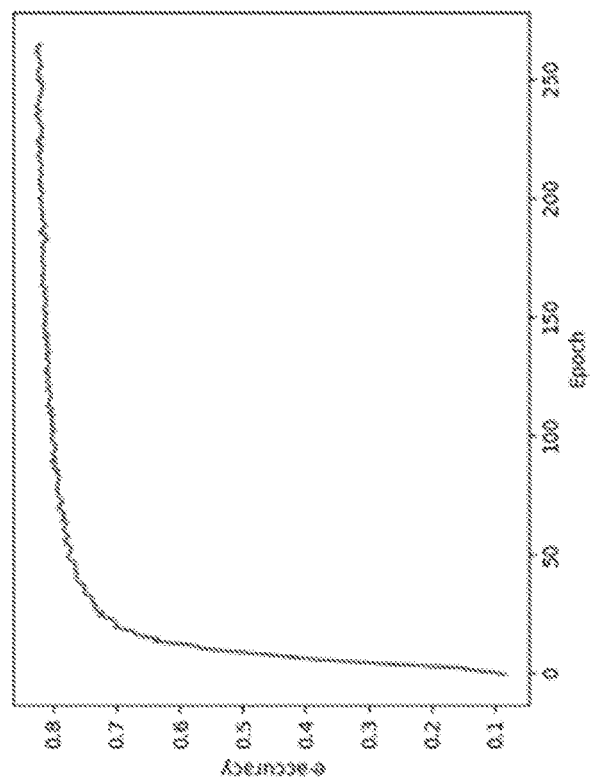
FIG. 9 illustrates C-accuracy with respect to a number of epochs in accordance with implementations of various techniques described herein.

This accuracy metric (e.g., ε-accuracy) may prevent the training from an early stop because the exact accuracy stops increasing, but rather monitors on the convergence of predictions towards the solutions' neighborhood. For example, conventional training systems for neural networks may cease training a neural network when the conventional accuracy stops increasing as can be seen in FIG. 8 to prevent overfitting. As discussed above and in some implementations, due to the ambiguity of some labels, the conventional accuracy metric may not allow a neural network to be properly trained. However, by utilizing the ε-accuracy metric, well log depth matching process 10 may extend the training 220 of the neural network beyond that of conventional training of neural networks. In this manner, well log depth matching process 10 may enable a more robust and efficient training to the neural network by accounting for ambiguities in the labeling of training data. In some implementations, the validation set may be used to fine-tune one or more hyper-parameters (e.g., with HyperOpt) to avoid exhaustively searching in the whole space:

$Number_{hidden} \in \{1, 2, 3, 4, 5, 6\}$ $Size_{hidden} \in \{2^8, 2^9, 2^{10}, 2^{11}, 2^{12}, 2^{13}, 2^{14}\}$ $Dropout \in \{0, 0.25, 0.5\}$ $Size_{batch} \in \{2^4, 2^5, 2^6, 2^7, 2^8\}$ In some implementations, the computation time employed for training may be about 150 hours with use of tree-structured Parzen Estimators (TPE). In some implementations, well log depth matching process 10 may obtain the following exemplary best-scoring combination:

$Number_{hidden} = 2$ $Size_{hidden} = 213$ $Dropout = 0.5$ $Size_{batch} = 2^6$ In some implementations, well log depth matching process 10 may apply dropouts between hidden layers of the neural network. A dropout may generally include a value discarded from the neural network. As known in the art, dropout generally may reduce the possibility of overfitting. In some implementations, applying dropouts between hidden layers of the neural network may be very different than the conventional dropout technique of applying a dropout directly on the input. For example, dropping between hidden layers as opposed to at the input may lead to better performance because of the fact that well log depth matching process 10 may deeply relate to the signals' values and shape details, like a much more robust and adaptive correlation technique. Therefore, discarding information directly from the input might cause non-unique solutions in many cases, whereas information after hidden layers is already synthesized and abstract. The training performance may be shown in FIGS. 6-9.

Figure 6:
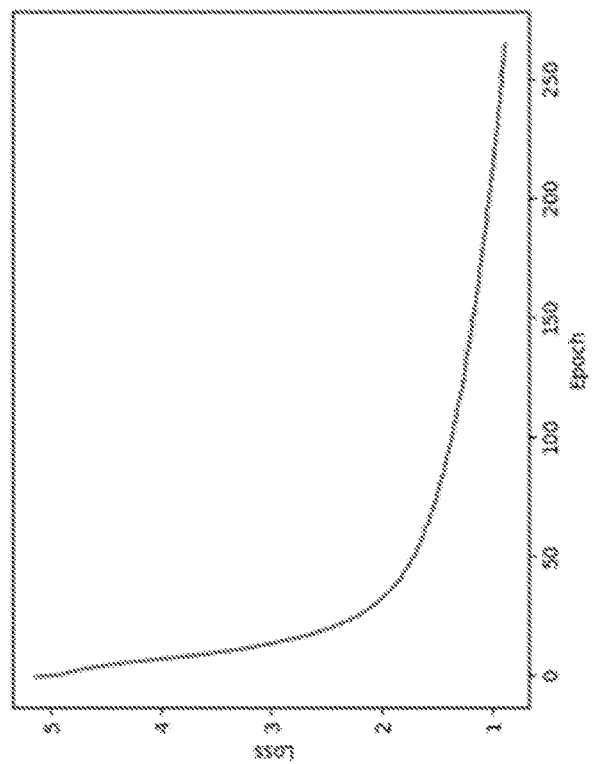
FIG. 6 illustrates training loss with respect to a number of epochs in accordance with implementations of various techniques described herein.
Figure 7:
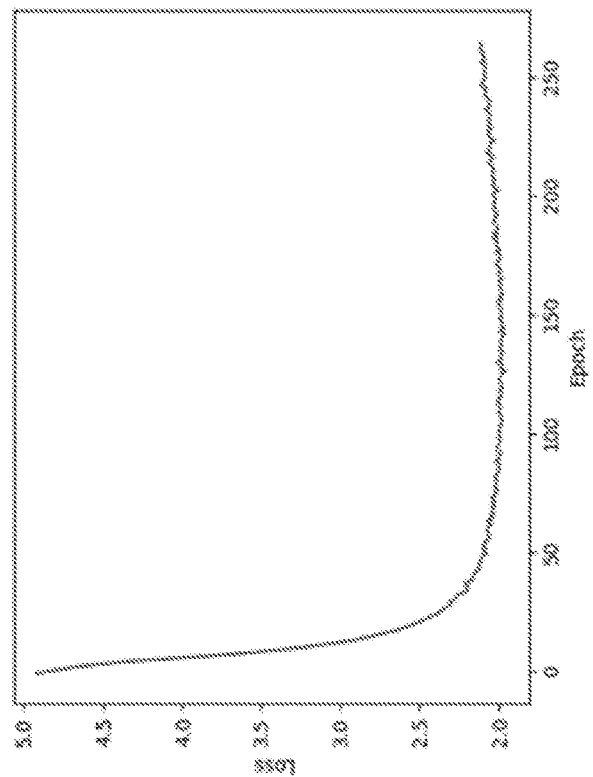
FIG. 7 illustrates validation loss with respect to a number of epochs in accordance with implementations of various techniques described herein.

In some implementations, FIG. 6 may show the training loss with respect to the number of epochs 600. An epoch may generally include one full training cycle on the training set. Once every sample in the set is seen, a second epoch may begin. FIG. 7 may show the validation loss with respect to the number of epochs 700. FIG. 8 may show the accuracy with respect to the number of epochs 800. In some implementations, FIG. 9 may show the ε-accuracy with respect to the number of epochs 900. The aforementioned training procedure on the architecture as shown in FIGS. 6-9 was trained with an early-stopping on both the accuracy and ε-accuracy with a patience of e.g., 15 epochs.

It may be observed that both validation accuracies keep increasing while the loss has passed its minimum point and starts to slightly increase. While this behavior is not common, this may be explained by the meaning of the cross-entropy loss for a multi-target classification problem. Explicitly, this loss may represent the confidence of the decision taken by the neural network. Hence, the accuracy may still improve and the certainty decreases for very difficult problems, where the probabilities are spread on neighboring points of the solution.

Figure 10:
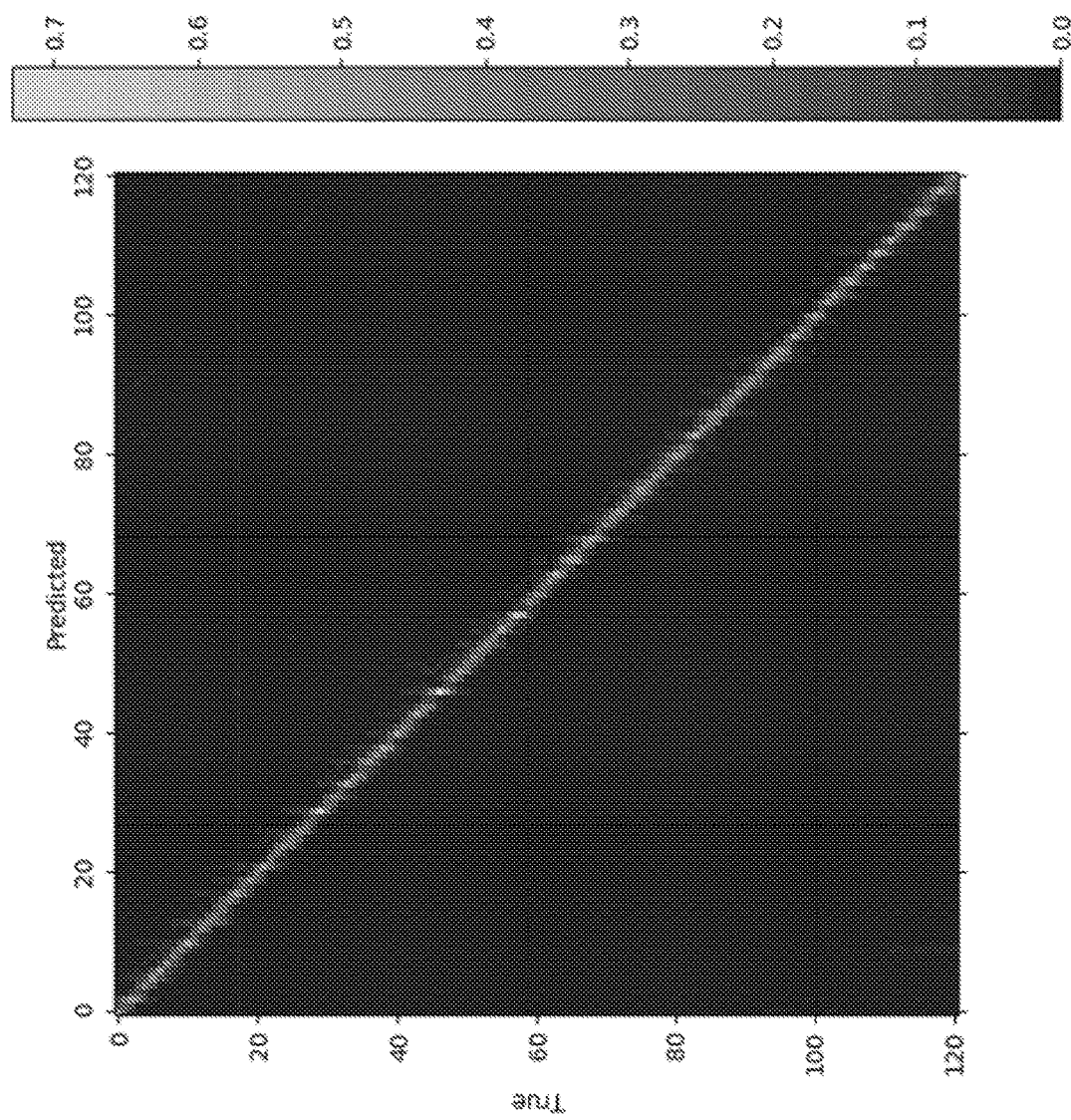
FIG. 10 illustrates a confusion matrix on a validation set with true vs. predicted shifts in accordance with implementations of various techniques described herein.
Figure 11:
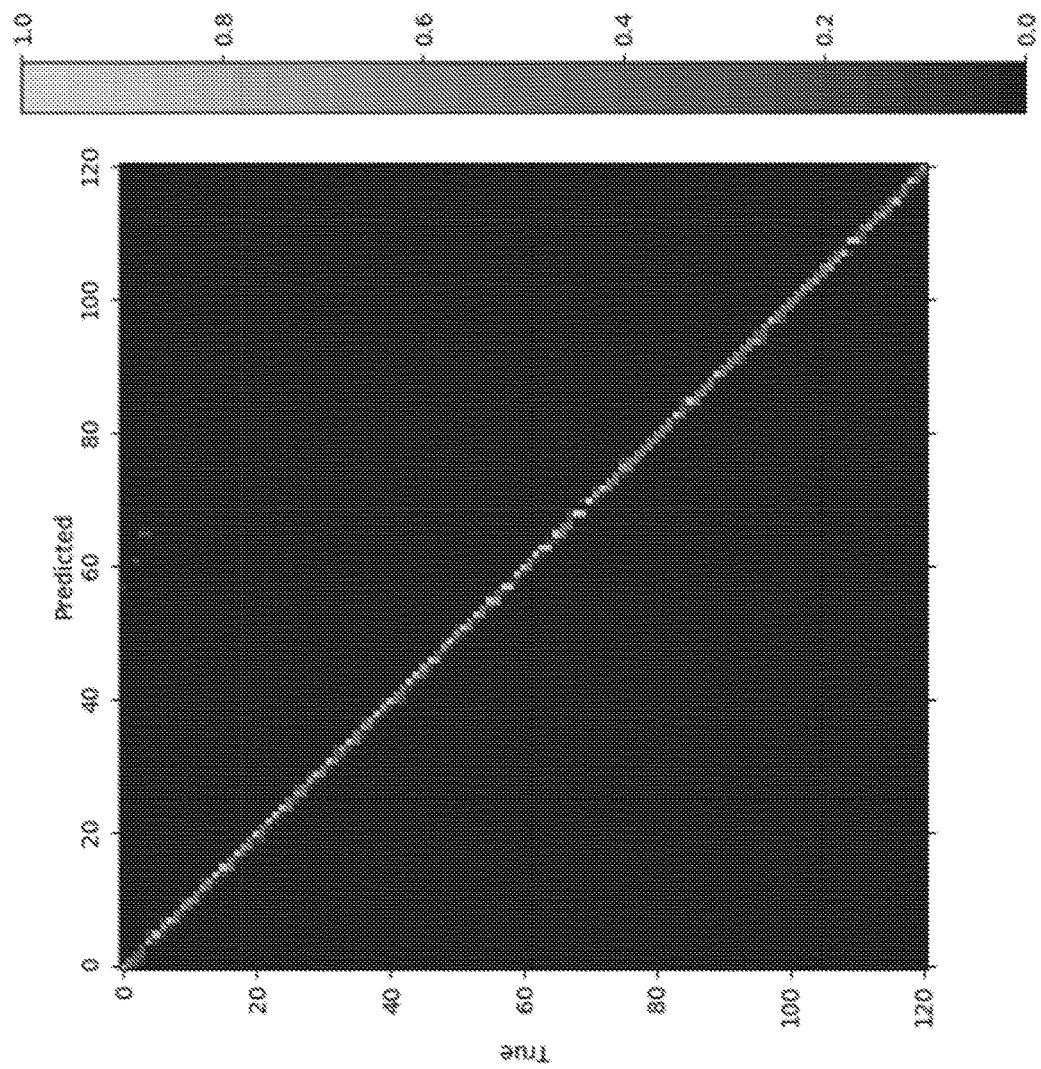
FIG. 11 illustrates a confusion matrix on a testing set with true vs. predicted shifts in accordance with implementations of various techniques described herein.

From the training, well log depth matching process 10 may keep the optimal point of ε-accuracy as the final model and obtain the following confusion matrices, on the validation and the testing set 1000, 1100, as shown in FIGS. 10 and 11. Alternatively, in numbers, well log depth matching process 10 may determine:

36.6% accuracy, 83.19% ε-accuracy on the validation set 58.99% accuracy, 99.47% ε-accuracy on the testing set In the above example, 178 pairs were manually labeled. In some implementations, the validation numbers may be more representative of the true performance from the empirical tests conducted on the inferences. In some implementations, the greatest errors are consistent as can be seen on the confusion matrices, the differences between the true shifts and the predicted ones are constant, hence the error lines parallel to the diagonal.

Now that well log depth matching process 10 has generated an appreciable 80% E-accuracy, well log depth matching process 10 may use that model to conceive a fully automated framework. When considering the typical precision-recall trade-off for determining a depth shift between well logs, i.e., getting all correct shifts versus getting only correct shifts, it is easy to settle for a very high precision, at the cost of discarding some shifts which were correctly predicted. In some implementations, well log depth matching process 10 may not afford wrong matching pairs, and may want retained ones to be correct. Nonetheless, well log depth matching process 10 may need to counterbalance this and afford discarding many points, thus well log depth matching process 10 may take a very loose sampling strategy for the point of interests. Namely, well log depth matching process 10 may take all the local minima and maxima, which typically constitutes about 80% of all the points for high-resolution signals.

In some implementations, determining 202 the depth shift between at least one well log of the plurality of well logs and at least one other well log may include performing 222 one or more equality tests on the at least one well log of the plurality of well logs and at least one other well log of the plurality of well logs. For example, for each proposed point of interest, well log depth matching process 10 may do inference through the trained model (e.g., the neural network) and get a predicted shift by taking the maximal probability. From there, well log depth matching process 10 may align the windows based on, at least in part, this shift: $S_{ref}$ and $\overline{S}_{desync}$. In response to aligning the windows, well log depth matching process 10 may input different compositions of these two shifted signals in the model, and perform one or more of the following equality tests with the output:

$$\text{model}([\tilde{S}_{ref}, \tilde{S}_{desync}]) \stackrel{?}{\Rightarrow} 60$$

$$\text{model}([\tilde{S}_{desync}, \tilde{S}_{ref}]) \stackrel{?}{\Rightarrow} 60$$

$$\text{model}([\text{flip}_{lr}(\tilde{S}_{ref}), \text{flip}_{lr}(\tilde{S}_{desync})]) \stackrel{?}{\Rightarrow} 60$$

$$\text{model}([\text{flip}_{lr}(\tilde{S}_{desync}), \text{flip}_{lr}(\tilde{S}_{ref})]) \stackrel{?}{\Rightarrow} 60$$

Where $\text{flip}_{lr}$ may stand for a vertical symmetry (left-right flip) of the signal. However, it will be appreciated that other symmetries may be used within the scope of the present disclosure.

As shown in the above equations, ideally, all should agree and output 60, i.e. no shift since the signals $\tilde{S}_{ref}$ and $\acute{S}_{desync}$ are aligned and of size 121. While an output of 60 has been discussed, it will be appreciated that any output (e.g., based on the number of points) may be used within the scope of the present disclosure. In some implementations utilizing all four of the above equality tests and upon passing each of the equality tests, well log depth matching process 10 may only assess the validity of the original predicted shift. This technique is called stacking and may be a critical element allowing a fully automated framework, discarding more than 90% of the unreliable predictions.

In some implementations, the plurality of well logs may be matched 204 with one another based upon, at least in part, the depth shift between the at least one well log and the at least one other well log. As discussed above and in some implementations, well log depth matching process 10 may determine 202 a depth shift between at least one well log of the plurality of well logs and at least one other well log. For example, well log depth matching process 10 may output (e.g., via the neural network) a depth shift with the highest probability.

Figure 12:
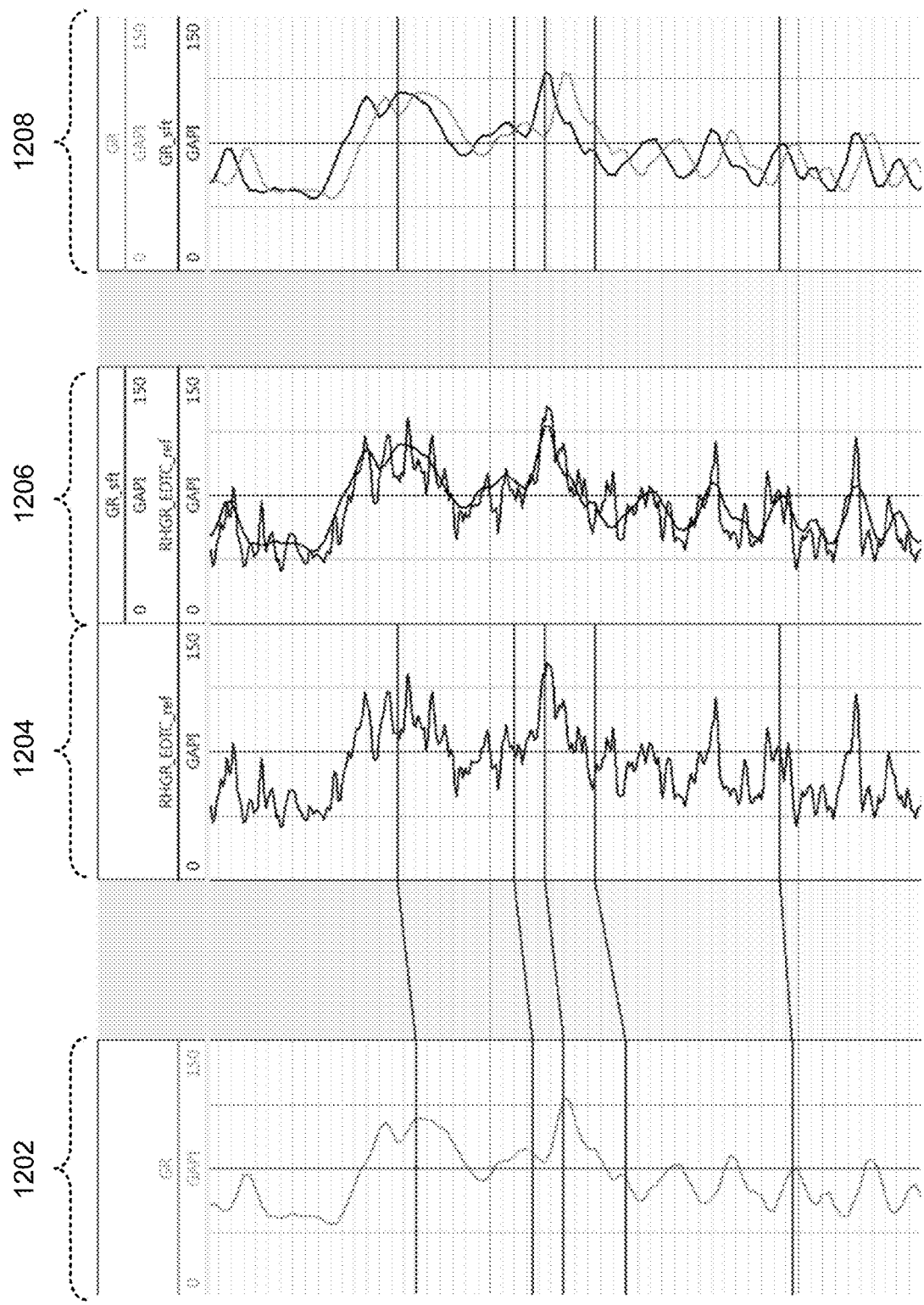
FIG. 12 illustrates a testing example in accordance with implementations of various techniques described herein.

In some implementations, matching 204 the plurality of well logs with one another includes aligning 224 the plurality of well logs based upon, at least in part, a plurality of anchor points. The following experiments were conducted on a totally unseen well during the training phase. As shown in FIG. 12 it may be observed that the high-resolution nature of the reference signal $S_{ref}$ (e.g., column 1204) renders the problem rather difficult even for a human. The first column, e.g., column 1202, may represent the desynchronized signal $S_{desync}$, which is a low-resolution one. Nonetheless, it could also happen to be a high-resolution signal. Here, performance may be observed from well log depth matching process 10 even in the presence of resolution discrepancies. In some implementations, the third column (e.g., column 1206) may show the resulting alignment with respect to a plurality of anchor points (red lines here) of the two signals.

In some implementations, aligning 224 the plurality of well logs includes sampling 226 at least one of the plurality of well logs between the plurality of anchor points. For example, well log depth matching process 10 may remove redundant anchor pairs from the filtered set by simply discarding the ones which are surrounded by similar shifts gradients. In some implementations, such pairs of anchor points may be useless and may not impact the final alignment process. With this final set of matching anchor points, well log depth matching process 10 may resample 226 (e.g., linearly or nonlinearly) between the anchor points to align the signals. Referring again to FIG. 12 and in some implementations, the absolute shift experienced by the desynchronized signal's cable may be shown in the fourth column (e.g., column 1208). In at least this example, the desynchronized signal may be linearly resampled 226 between anchor points. In this manner, it may be observed that well log depth matching process 10 makes very few mistakes and would out-perform the matching capacities of a human on non-straightforward pairs.

In some implementations, embodiments of the present disclosure may cope with the issue of limited training data by receiving 200 well logs from a wide variety of wells, processing them with well log depth matching process 10 (e.g., determining 202 the depth shift and/or matching 204 the well logs based upon, at least in part, the depth shift) to automatically get anchor points and then manually assess correct ones, which can then be fed back into the learning process. In this way, well log depth matching process 10 may continuously improve in performance, robustness, and confidence, which will lead to a high recall even in the presence of filtering tests.

In some implementations, well log depth matching process 10 may be general enough to work on different signals with the appropriate training set (i.e., it is not limited to the matching of gamma ray logs). For example, thin layers where gamma-ray logs alignment may not provide enough precision, dielectric signals or other high-resolution signals may be synchronized. For example, well log depth matching process 10 may label dielectric signals from a single well. This is important given the implications of thin-layers alignment for the industry.

As discussed above, embodiments of well log depth matching process 10 may describe a viable automated workflow to the problem of depth matching through gamma-ray of logs from multiple passes. Well log depth matching process 10 may employ data formation to alleviate the problem's difficulty and a stacking technique to take advantage of the accuracy and reduce human intervention to essentially none.

In some implementations, well log depth matching process may address target areas of the well where shifts are expected to occur with resulting depth mismatch between various by using the cable tension and acceleration information of the at least one recording device (e.g., device 60). For example, the cable tension and/or acceleration information may provide valuable information to prevent vainly trying to correct non-existing shifts, at the risk of introducing false-positives in these zones.

In some implementations, well log depth matching process 10 may include using field data, synthetic data, or realistic synthetic data refined by augmentation-enabling networks such as Generative Adversarial Networks (GANs), or any combinations of these for the model training.

Figure 13:
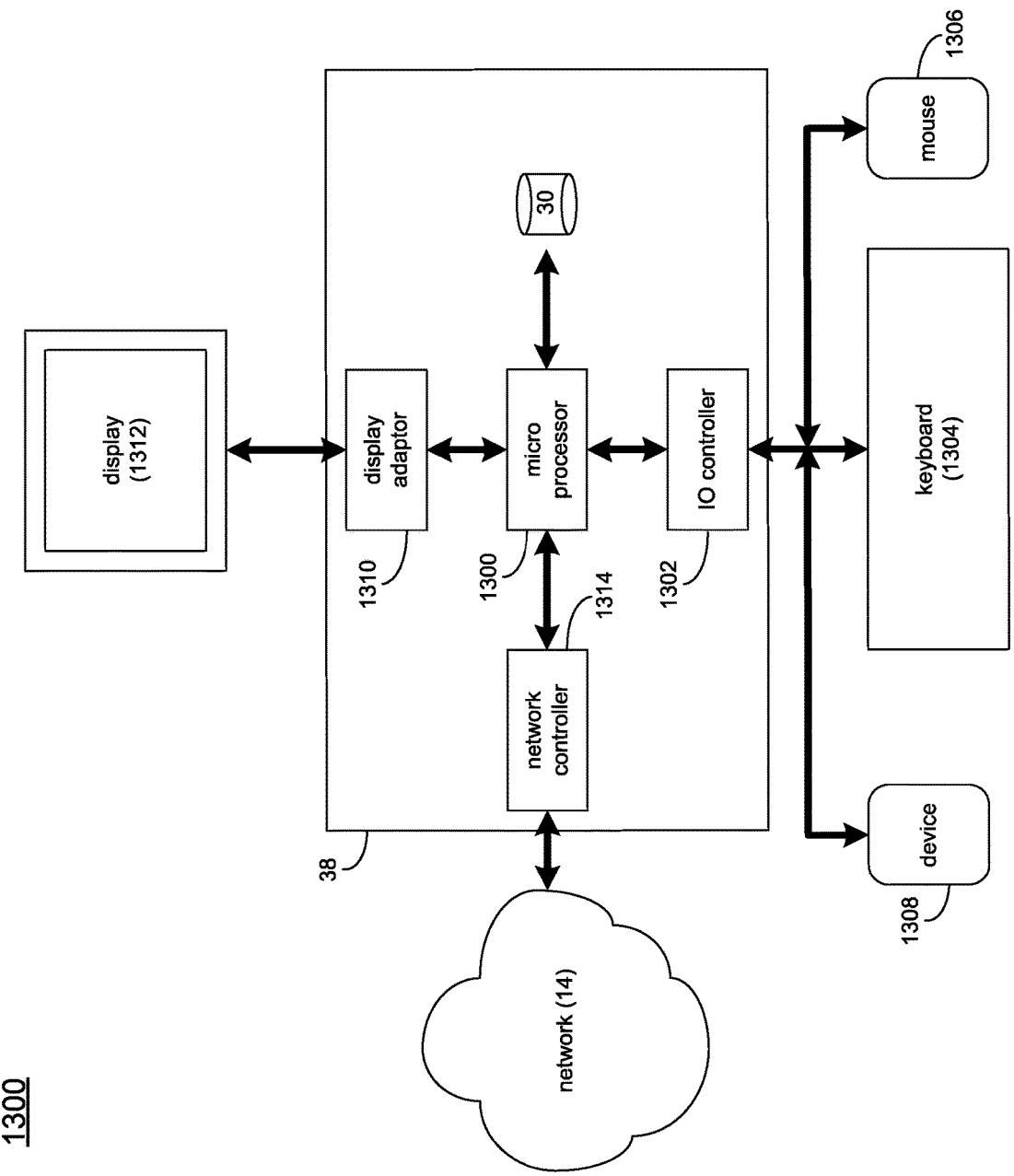
FIG. 13 is an example diagrammatic view of a client electronic device of FIG. 1 according to one or more example implementations of the disclosure.

Referring also to FIG. 13, there is shown a diagrammatic view of client electronic device 38. While client electronic device 38 is shown in this figure, this is for illustrative purposes only and is not intended to be a limitation of this disclosure, as other configurations are possible. For example, any computing device capable of executing, in whole or in part, webpage component replication process 10 may be substituted for client electronic device 38 within FIG. 13, examples of which may include but are not limited to computing device 12 and/or client electronic devices 30, 32, 34, 36.

Client electronic device 38 may include a processor and/or microprocessor (e.g., microprocessor 1300) configured to, e.g., process data and execute the above-noted code/instruction sets and subroutines. Microprocessor 1300 may be coupled via a storage adaptor (not shown) to the above-noted storage device(s) (e.g., storage device 30). An I/O controller (e.g., I/O controller 1302) may be configured to couple microprocessor 1300 with various devices, such as keyboard 1304, pointing/selecting device (e.g., mouse 1306), custom device, such a microphone (e.g., device 1308), USB ports (not shown), and printer ports (not shown). A display adaptor (e.g., display adaptor 1310) may be configured to couple display 1312 (e.g., CRT or LCD monitor(s)) with microprocessor 1300, while network controller/adaptor 1314 (e.g., an Ethernet adaptor) may be configured to couple microprocessor 1300 to the above-noted network 14 (e.g., the Internet or a local area network).

The flowchart and block diagrams in the figures illustrate the architecture, functionality, and operation of possible implementations of systems and methods and according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As used in any embodiment described herein, the term "circuitry" may comprise, for example, singly or in any combination, hardwired circuitry, programmable circuitry, state machine circuitry, and/or firmware that stores instructions executed by programmable circuitry. It should be understood at the outset that any of the operations and/or operative components described in any embodiment or embodiment herein may be implemented in software, firmware, hardwired circuitry and/or any combination thereof.

The terminology used herein is for the purpose of describing particular embodiments and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Although a few example embodiments have been described in detail above, those skilled in the art will readily appreciate that many modifications are possible in the example embodiments without materially departing from the scope of the present disclosure, described herein. Accordingly, such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

Having thus described the disclosure of the present application in detail and by reference to embodiments thereof, it will be apparent that modifications and variations are possible without departing from the scope of the disclosure defined in the appended claims.

What is claimed is:

1. A computer-implemented method for well log depth matching, comprising:

receiving, on a computing device, a plurality of well logs;

training a neural network to generate a trained neural network configured to determine a depth shift between a first well log of the plurality of well logs corresponding to a first well and a second well log of the plurality of well logs corresponding to a second well, wherein training the neural network comprises:

generating training data via one or more data augmentation transformations randomly applied on at least one well log of the plurality of well logs, wherein the one or more data augmentation transformations comprise applying additive noise to the at least one well log of the plurality of well logs;

applying a first accuracy metric indicative of a proportion of output that is representative of a ground-truth to total output; and applying a second accuracy metric that increases the output that is representative of the ground-truth by including outputs representative of a convergence towards the ground-truth; and determining, using the trained neural network, the depth shift between the first well log and the second well log, wherein determining the depth shift comprises:

automatically generating a plurality of points of a reference signal corresponding to at least a portion of the first well log;

determining a point of interest of the plurality of points of the reference signal, wherein the point of interest corresponds to a first depth of the first well;

creating a first window around the point of interest, wherein the first window comprises a first set of points;

identifying a corresponding point in a desynchronized signal corresponding to at least a portion of the second well log using the trained neural network, wherein the corresponding point corresponds to the point of interest and a second depth of the second well;

creating a second window around the corresponding point, wherein the second window comprises a second set of points;

inputting the first set of points and the second set of points into the trained neural network to obtain an output from the trained neural network comprising a probability over possible depth shifts between the first set of points and the second set of points; and
determining the depth shift between the first well log and the second well log based upon, at least in part, the probability over possible depth shifts between the first set of points and the second set of points; and
matching the plurality of well logs with one another based upon, at least in part, the depth shift between the first well log and the second well log.

2. The computer-implemented method of claim 1, wherein determining the point of interest includes receiving a set of manually picked points of interest.

3. The computer-implemented method of claim 1, wherein determining the point of interest includes automatically generating a set of points of interest.

4. The computer-implemented method of claim 1, wherein determining the depth shift between the first well log and the second well log includes performing one or more equality tests on the first well log and the second well log.

5. The computer-implemented method of claim 1, wherein one or more of field data, synthetic data, and realistic synthetic data refined by augmentation enabling networks and Generative Adversarial Networks (GANs), are used for training the neural network.

6. The computer-implemented method of claim 1, wherein matching the plurality of well logs with one another includes aligning the plurality of well logs based upon, at least in part, a plurality of anchor points.

7. The computer-implemented method of claim 6, wherein aligning the plurality of well logs includes sampling at least one other well log of the plurality of well logs between the plurality of anchor points.

8. A computing system including one or more processors and one or more memories configured to perform operations comprising:
receiving a plurality of well logs;
training a neural network to generate a trained neural network configured to determine a depth shift between a first well log of the plurality of well logs corresponding to a first well and a second well log of the plurality of well logs corresponding to a second well, wherein training the neural network comprises:
generating training data via one or more data augmentation transformations randomly applied on at least one well log of the plurality of well logs, wherein the one or more data augmentation transformations comprise applying additive noise to the at least one well log of the plurality of well logs;
applying a first accuracy metric indicative of a proportion of output that is representative of a ground-truth to total output; and
applying a second accuracy metric that increases the output that is representative of the ground-truth by including outputs representative of a convergence towards the ground-truth;
determining, using the trained neural network, the depth shift between the first well log of the plurality of well logs and the second well log, wherein determining the depth shift comprises:
automatically generating a plurality of points of a reference signal corresponding to at least a portion of the first well log;
determining a point of interest of the plurality of points of the reference signal, wherein the point of interest corresponds to a first depth of the first well;
creating a first window around the point of interest, wherein the first window comprises a first set of points;
identifying a corresponding point in a desynchronized signal corresponding to at least a portion of the second well log using the trained neural network, wherein the corresponding point corresponds to the point of interest and a second depth of the second well;
creating a second window around the corresponding point, wherein the second window comprises a second set of points;
inputting the first set of points and the second set of points into the trained neural network to obtain an output from the trained neural network comprising a probability over possible depth shifts between the first set of points and the second set of points; and
determining the depth shift between the first well log and the second well log based upon, at least in part, the probability over possible depth shifts between the first set of points and the second set of points; and
matching the plurality of well logs with one another based upon, at least in part, the depth shift between the first well log and the second well log.

9. The computing system of claim 8, wherein defining the point of interest includes receiving a set of manually picked points of interest.

10. The computing system of claim 8, wherein defining the point of interest includes automatically generating a set of points of interest.

11. The computing system of claim 8, wherein determining the depth shift between the first well log and the second well log includes performing one or more equality tests on the first well log and the second well log.

12. The computing system of claim 8, wherein one or more of field data, synthetic data, and realistic synthetic data refined by augmentation-enabling networks and Generative Adversarial Networks (GANs), are used for training the neural network.

13. The computing system of claim 8, wherein matching the plurality of well logs with one another includes aligning the plurality of well logs based upon, at least in part, a plurality of anchor points.

14. The computing system of claim 13, wherein aligning the plurality of well logs includes sampling at least one other well log of the plurality of well logs between the plurality of anchor points.

15. The computer-implemented method of claim 1, further comprising classifying each point of the second set of points of the second window with the point of interest to determine the depth shift between matching points between the first set of points of the first window and the second set of points of the second window relative to the point of interest.

16. The computing system of claim 8, further comprising classifying each point of the second set of points of the second window with the point of interest to determine the depth shift between matching points between the first set of points of the first window and the second set of points of the second window relative to the point of interest.

* * * * *